July 7, 1931.    L. W. RAWSON    1,813,638
ACCELERATING CLUTCH
Filed May 7, 1928     4 Sheets-Sheet 1
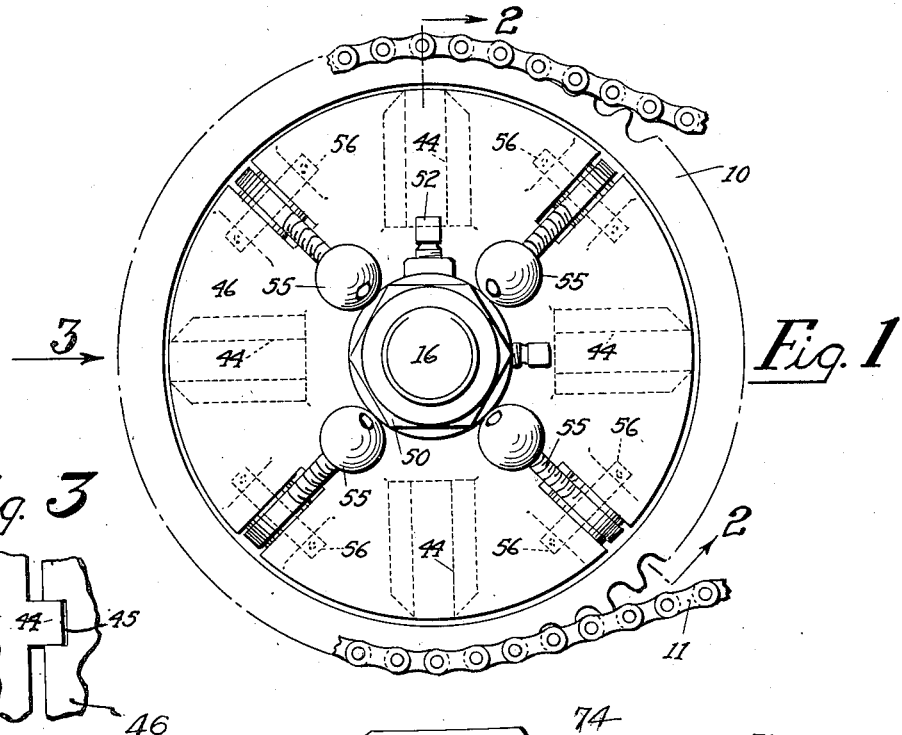
Fig. 1
Fig. 3
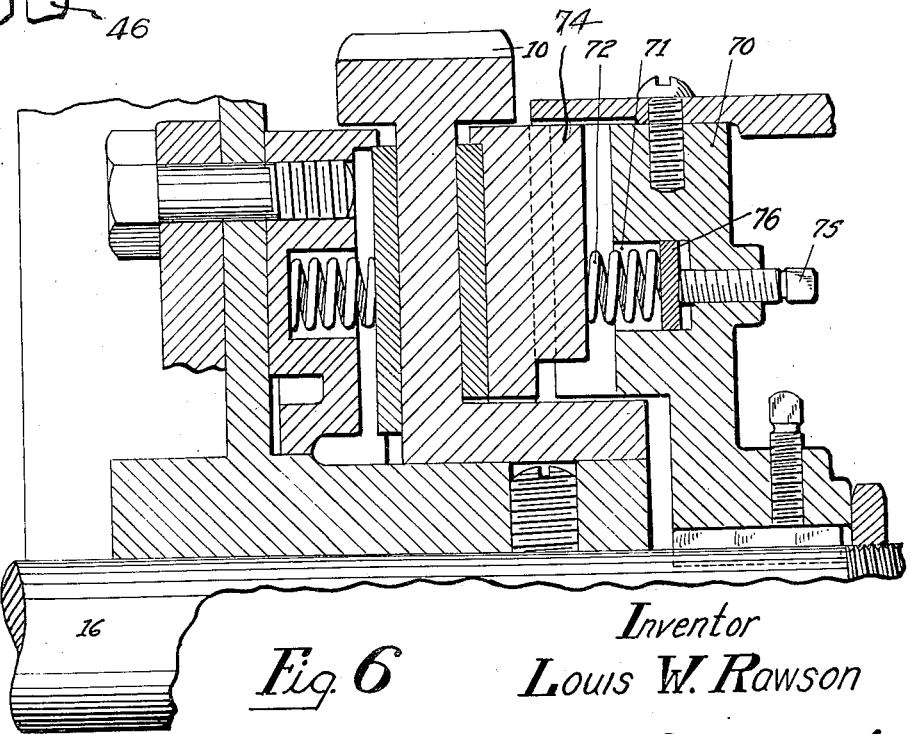
Fig. 6
Inventor
Louis W. Rawson
Attorneys July 7, 1931.  L. W. RAWSON  1,813,638
ACCELERATING CLUTCH
Filed May 7, 1928  4 Sheets-Sheet 3

Inventor
Louis W. Rawson
Attorneys

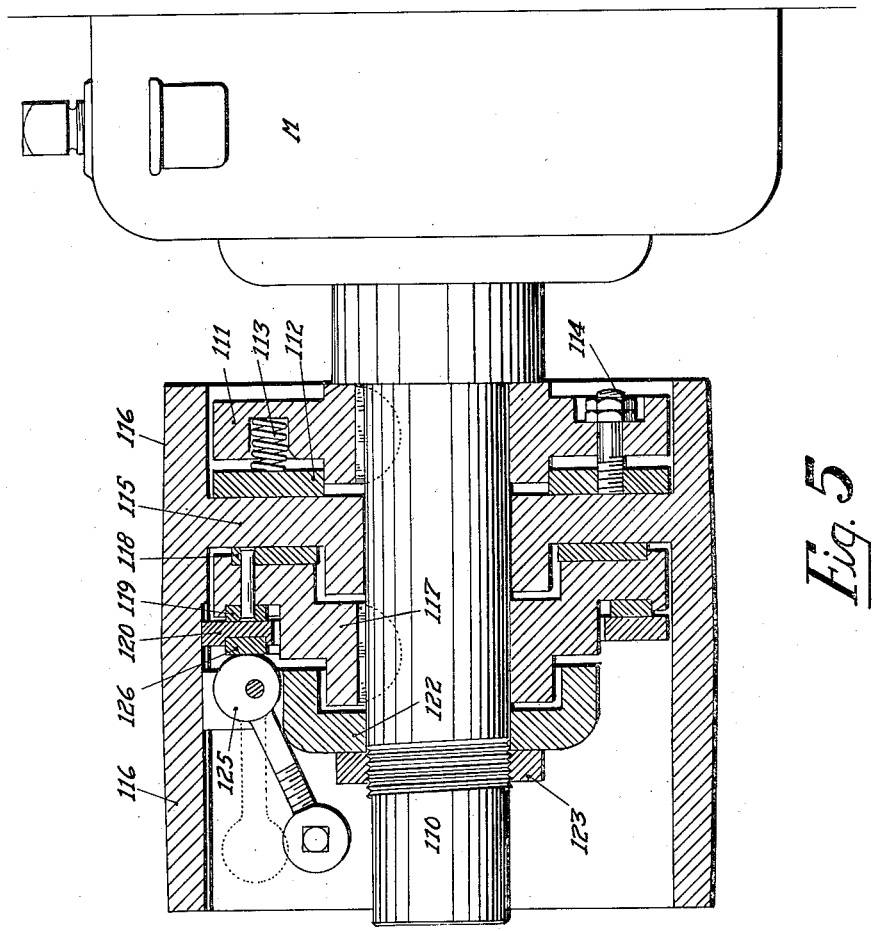

Patented July 7, 1931

1,813,638

UNITED STATES PATENT OFFICE

LOUIS W. RAWSON, OF WORCESTER, MASSACHUSETTS, ASSIGNOR TO WORCESTER POLYTECHNIC INSTITUTE, OF WORCESTER, MASSACHUSETTS, A CORPORATION OF MASSACHUSETTS

ACCELERATING CLUTCH

Application filed May 7, 1928. Serial No. 275,856.

This invention relates to a clutch or coupling designed to gradually increase the speed of a rotatable driven member. In many kinds of service, it is necessary for a driving mechanism to pick up a heavy load and bring it up to a predetermined speed of rotation. This ordinarily produces a very heavy strain on the driving mechanism and necessitates the use of larger and heavier mechanism than would otherwise be necessary. This is found to be particularly the case with motor driven machines.

It is the general object of my invention to provide a clutch or driving connection, so designed that it will start the load in motion at slow speed and under a relatively light driving tension, and that it will gradually and automatically increase the driving tension as the load gains speed, until the full force of the driving mechanism is effectively applied and the load is rotating at normal speed.

In the preferred form of my invention, the initial driving tension is frictional and the gradually increasing driving tension is centrifugally applied.

A preferred form of my invention in different applications and a slight modification thereof are shown in the drawings in which Fig. 1 is an end view of a clutch embodying my improvements;

Fig. 3 is a detail side view, looking in the direction of the arrow 3 in Fig. 1;

Fig. 5 is a sectional side elevation, showing my invention applied to a driven pulley on a motor shaft; and Fig. 6 is a partial sectional elevation of a slight modification.

Figure 2:
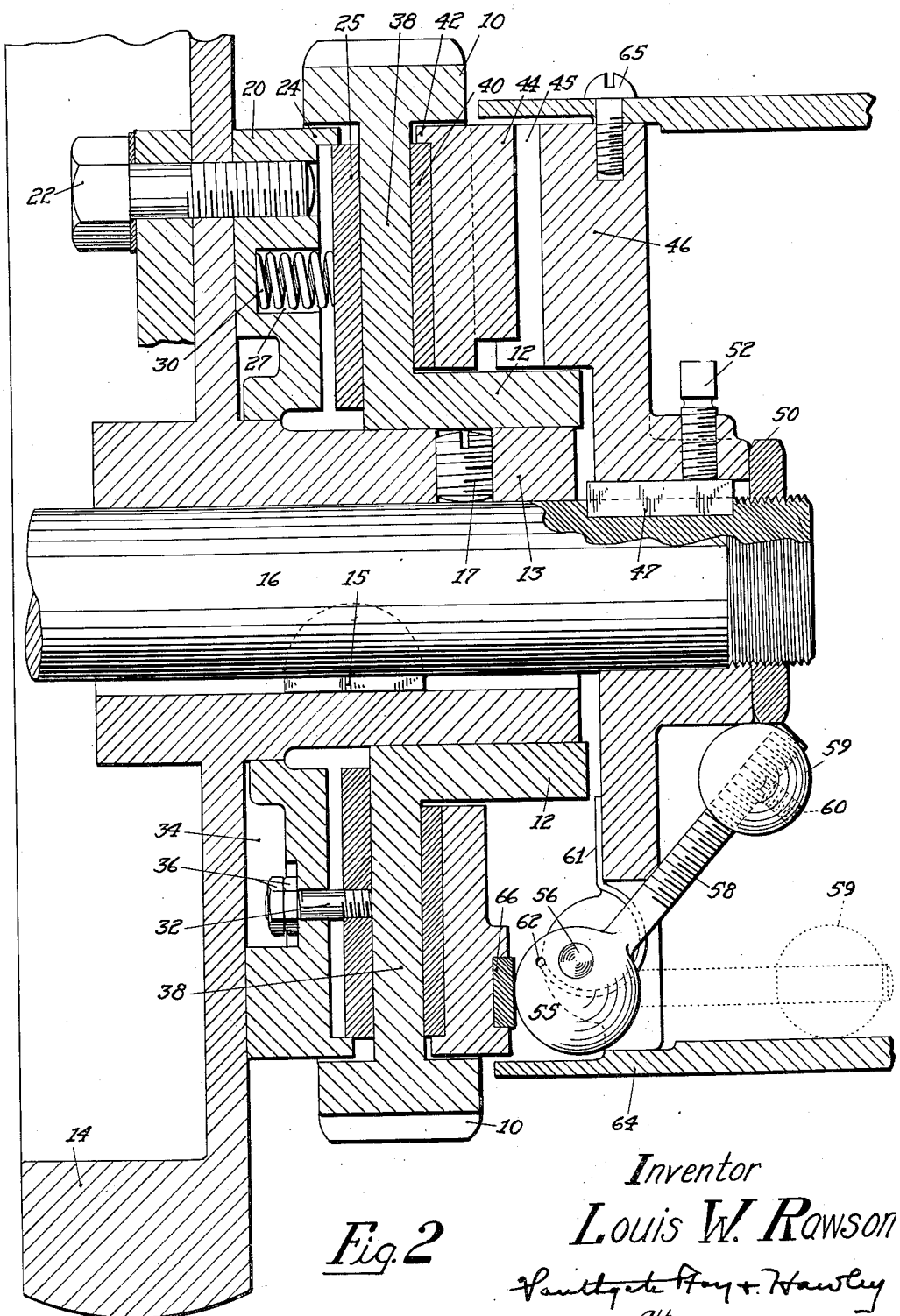
Fig. 2 is a sectional side elevation, taken along the line 2—2 in Fig. 1.

Referring particularly to Figs. 1 to 3, I have shown my invention therein as embodied in a clutch connecting a driving gear to a driven shaft. The gear 10 is continuously rotated at predetermined speed by a sprocket chain 11 (Fig. 1). The gear 10 is provided with a hub 12 which is rotatable on the inner hub 13 of a clutch supporting member 14, keyed at 15 to a driven shaft 16. The member 14 may also be provided with a set screw 17 to retain the member in fixed axial position on the shaft 16.

An annular plate 20 is centered on the hub 13 of the member 14 and is clamped against the side of the member 14 by bolts 22. The plate 20 has an outwardly projecting flange 24 within which a friction disc or ring 25 is loosely centered. The plate 20 is provided with a series of recesses 27 to receive springs 30 which engage the friction disc 25 and act to force the same outward away from the plate 20. Studs 32 (Fig. 2) are threaded into the friction disc 25 and extend through the adjacent wall of the plate 20 to recesses 34, where the studs 32 are provided with lock nuts 36. The studs 32 are freely slidable through the wall of the plate 20 and by adjustment of the lock nuts 36 the extreme outward position of the friction disc may be regulated. The studs 32 also prevent relative rotation between the disc 25 and the plate 20.

The outer face of the friction disc 25 engages one face of the web 38 of the driving gear 10. The opposite face of the web is engaged by a second friction disc 40 seated in a plate or holder 42 having rearwardly projecting portions 44 (Fig. 3) received in slots 45 in a support 46 keyed at 47 to the driven shaft 16 but slidable thereon. The axial position of the support 46 may be varied by turning an adjusting nut 50, threaded on the end of the shaft 16, and the support may be held in adjusted position by a set screw 52.

A plurality of centrifugal cam members 55 are mounted on pivots 56 in the support 46 and are provided with threaded stems 58 having weights 59 threaded thereon and held in position by set screws 60. Springs 61 may be provided, each havng one end thereof inserted in a hole 62 in one of the cam members 55 and having the other end engaging the support 46, as clearly shown in Fig. 2. The springs 61 are merely strong enough to overcome the force of gravity and hold the centrifugal cam members normally in the full line position shown in Fig. 2.

A guard plate 64 is secured to the outer surface of the support 46 by clamping screws 65 and forms a guard for the mechanism, while at the same time acting as an outer stop for the centrifugal members, as indicated in the lower part of Fig. 2.

Having described the details of construction of one form of my invention, the operation thereof is as follows:—

Assuming that the driven shaft 16 is stationary and is connected to a relatively heavy load, the gear 10 is started in rotation at a predetermined and normal speed. The gear rotates freely on the hub 13 of the clutch supporting member 14, but is frictionally engaged by the friction disc 25 on one side and the disc 40 on the other. The amount of the friction pressure is determined by the size and compression of the springs 30, and the amount of compression may be adjusted by moving the support 46 axially toward or from the supporting member 14 by use of the adjusting nut 50.

It will be understood that the plate 42 is forced outward or to the right in Fig. 2 until wear plates 66 thereon firmly engage the centrifugal cam members 55 when said members are in their inward or full line position indicated in Fig. 2.

The initial friction is adjusted to such an amount that the driven shaft 16 will be started in slow rotation by the driving gear 10. As the speed of rotation of the shaft 16 increases, the weights 59 on the centrifugal cam members will tend to move outward under centrifugal force, applying cam pressure to the wear plates 66 on the disc 42 and acting to move the driving gear 10 to the left, compressing the springs 30 and gradually increasing the driving friction.

The driving tension is thus gradually and continuously built up, as an increase in friction causes an increase in speed and an increase in speed causes further outward movement of the weights 59, which in turn further compress the springs 30 and still further increase the friction.

As the driven shaft approaches full speed, the cam members 55 force the friction disc 25 firmly against the outer face of the plate 20, after which the device operates substantially the same as any usual centrifugal clutch.

If, however, by reason of overload or otherwise, the speed of rotation of the shaft 16 is reduced, there will be a corresponding decrease in the driving force, thus partially releasing or reducing the friction on the driving gear 10, and if the shaft 16 is held from rotation, the centrifugal force is entirely withdrawn and the initial friction only remains as a relatively light load on the gear 10.

It will thus appear that the load is picked up gradually and automatically and is thus brought up to normal speed, at which point the clutch operates like the usual centrifugal clutch. It will also be seen that the driving mechanism is effectively safeguarded, as any reduction in the speed of the driven shaft promptly and effectively reduces or releases the centrifugal force applied to the driving member.

The device has been found particularly applicable when used with motor-driven mechanism as the driving motor may operate continuously at its most advantageous speed and it is not necessary to provide for an excessive starting torque, as is the case where the work is picked up directly by the motor. The capacity of the clutch may be varied by adjusting the weights 59 on the lever stems 58. As the weights are adjusted outward, the power of the clutch increases and the time of acceleration is reduced.

In Fig. 6, I have shown a slight modification in which the support 70 is provided with recesses 71 in which additional springs 72 are seated for engagement with the outer face of the supporting disc 74. An adjusting screw 75 is provided for each spring, engaging a washer 76 and providing means by which the spring pressure may be quickly and easily adjusted from the outside of the clutch. This form of clutch operates substantially as previously described, with the exception that the initial friction can be varied without changing the axial position of the support 70. This permits the axial adjustment of the support 70 to be utilized for determining the working position of the cam members 55 and for taking up wear between the parts. In some cases where the service is particularly severe, the construction shown in Fig. 6 has been found desirable.

Figure 4:
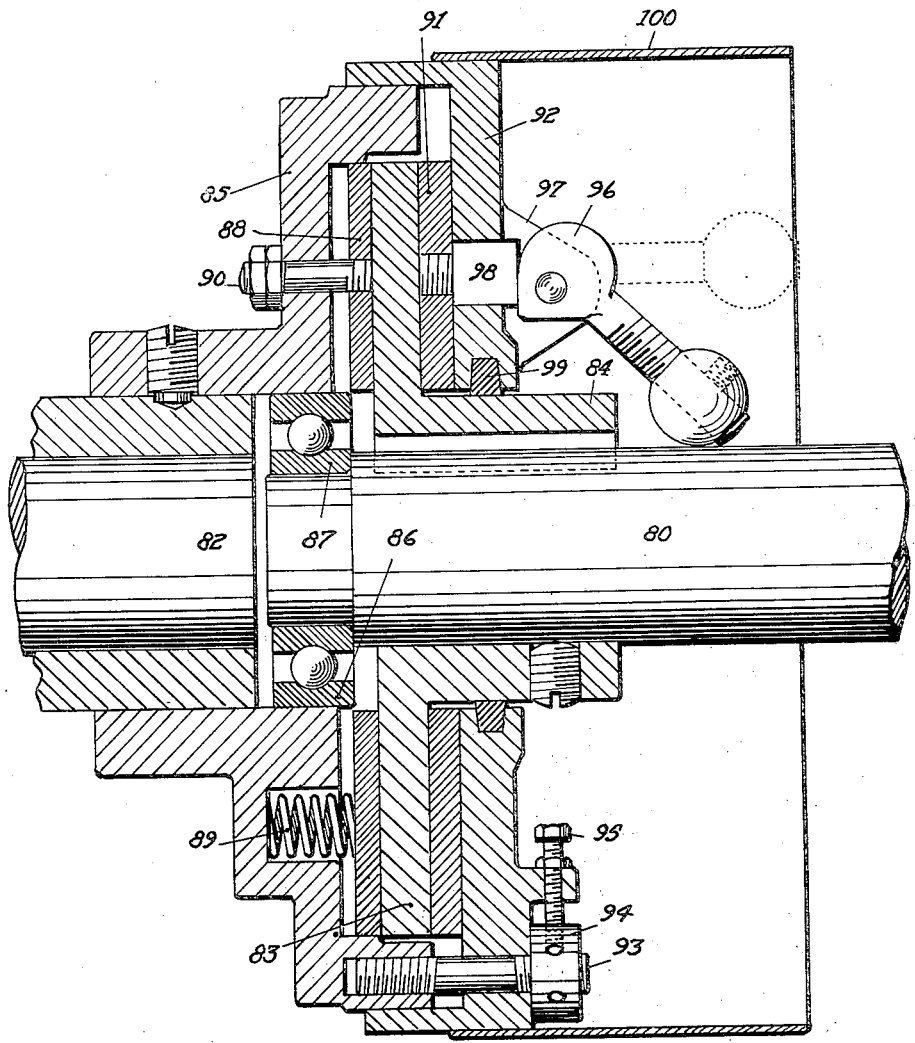
Fig. 4 is a sectional side elevation of my invention, embodied in a cut-off coupling.

In Fig. 4, I have shown my improved clutch embodied in a cut-off coupling between a driving shaft 80 and a driven shaft 82. A driving disc 83 is provided with a hub 84 keyed to the shaft 80 and rotating therewith. A support 85 is secured to the end of the driven shaft 82 and engages the outer race 86 of a ball bearing, the inner race 87 thereof being mounted on an extension of the driving shaft 80. The ball bearing acts to keep the shafts 80 and 82 axially aligned.

A friction disc 88 is slidable axially in a recess in the support 85 and is forced outward by springs 89 and limited in its outward movement by studs 90, as previously described. A second friction disc 91 is carried by a supporting disc 92 loose on the hub 84 of the driving disc 83 and held in adjusted axial relation with the support 85 by means of studs 93 seated in the support 85 and having adjusting nuts 94 engaging the outer face of the member 92 and held from rotation by lock screws 95.

Centrifugal cam members 96 are mounted on ears 97 projecting outwardly from the member 92 and engage the ends of studs 98 secured to the friction disc 91. A felt washer 99 is inserted in the inner edge of the member 92 and engages the hub 84 to prevent entrance of dirt between the friction surfaces. The usual guard plate 100 is secured to the outside of the member 92.

Assuming the driven shaft 82 at rest and that the driving shaft 80 is started in rotation at normal speed, the driving disc 83 will rotate between the friction discs 88 and 91, which will apply yielding friction to cause the shaft 82 to be slowly rotated. Rotation of the shaft 82 causes corresponding rotation of the supporting members 85 and 92, causing centrifugal outward movement of the cam members 96, thus gradually increasing the driving tension and bringing the driven member up to speed. My invention is thus shown to be well adapted for use in a cut-off coupling.

In Fig. 5, I have shown a device adapted for forming the driving connection between a driven pulley and a motor shaft. I have indicated a motor M having an armature shaft 110 on which is keyed a driving plate 111 having a friction disc 112 centered thereby and yieldingly pressed outward by springs 113, such outward movement being limited by studs 114 which also act as driving connections between the plate 111 and the disc 112. The friction disc 112 engages one face of the web 115 of a driven pulley 116, having a short hub which is freely rotatable on the shaft 110.

A second driving member 117 is keyed to the shaft 110 but is slidable thereon. The member 117 carries a friction disc 118 secured thereto and engaging the second face of the web 115 of the pulley 116.

A third friction disc 119, mounted on the driving member 117, engages a friction ring 120 fitting within the rim of the pulley 116 and slidable axially therein. The member 120 is keyed at separated points to the rim, thus preventing relative rotation thereof.

A support 122 is also mounted within the rim of the pulley 116 and is keyed for rotation therewith, while permitting axial movement relative thereto as in the case of the ring 120. This support 122 also has a hub portion loosely fitting the shaft 110 and engaged by an adjusting nut 123. Centrifugally operated cam levers 125 are pivoted in the support 122 and engage wear plates 126 in the ring 120 which is engaged by the friction plate 119.

The general operation of this device is similar to the forms already described. The driving plate 111 and driving member 117 positively rotate the discs 112, 118 and 119, which frictionally engage the two faces of the pulley web 115 and one face of the ring 120. Initial tension is determined by the springs 113, and the position of the centrifugal members may be adjusted by use of the nut 123. The entire mechanism is mounted within the pulley 116, making a very compact accelerating connection between the motor shaft and the load.

It should be noted that in the several forms of the invention, the spring or other equivalent means for applying the initial tension acts in opposition to the centrifugal or equivalent means for subsequently applying increased pressure. That is to say, the spring means applies a pressure, in a direction toward the centrifugal means and vice versa, the centrifugal means applies a pressure in a direction opposed thereto, or toward the spring means whereby the two pressures are in effect added to each other.

Having described several applications of my invention, the very great advantages thereof will be readily apparent. The device enables the driving member to come quickly to full speed, as is customary in electric motors, while at the same time it permits a substantial period within which the driven member may reach its normal speed. This feature has great advantages in many situations. For instance, in textile machinery such as drawing frames or carding engines, the slow starting of the machine greatly reduces the breakage of threads or slivers and thus reduces the cost of operation. In motor driven machinery, it avoids the necessity for providing unnecessarily large motors simply to produce a starting torque, and in single phase motors it permits the winding to be simplified and the usual starting mechanism to be omitted.

Having thus described my invention and the advantages thereof, I do not wish to be limited to the details herein disclosed, otherwise than as set forth in the claims, but what I claim is:—

1. An accelerating clutch comprising driving and driven members, spring means effective to provide an initial driving tension between said members, and means acting in opposition to said first means to increase said driving tension as the speed of rotation of said driving member increases, said last named means being mounted upon the driven member.

2. An accelerating clutch comprising driving and driven members, spring means effective to provide an initial driving tension between said members, and means acting in opposition to said first means to increase said driving tension as the speed of rotation of said driving member increases, and effective to decrease said driving tension as the speed of rotation of said driven member decreases.

3. An accelerating clutch comprising driving and driven members having friction surfaces, spring means effective to provide a constant initial pressure of said friction surfaces against each other, and means acting in opposition to said first means to increase said pressure as the speed of rotation of said driven member increases.

4. An accelerating clutch comprising a driving member, a driven member, friction driving connections between said members, spring means to initiate friction pressure between said connections and means acting in opposition to said first means to increase the friction pressure in a definite relation to the increase in speed of rotation of the driven member.

5. An accelerating clutch comprising a driving member, a driven member, friction driving connections between said members, spring means to initiate friction pressure between said connections and means to increase the friction pressure as the speed of rotation of said driven member increases, and effective to decrease said pressure as the speed of rotation decreases.

6. An accelerating clutch comprising a driving member, a driven member, friction driving connections between said members, spring means to initiate friction pressure between said connections and centrifugal clutch elements rotatable with said driven member and effective to engage the driving member with increasing pressure acting in opposition to said first means as the speed of rotation of said driven member increases.

7. An accelerating clutch comprising driving and driven members having friction surfaces, spring means effective to provide a constant initial pressure of said friction surfaces against each other, and centrifugally operated cam mechanism effective to increase said pressure in opposition to said first means as the speed of rotation of said driven member increases.

8. An accelerating clutch comprising driving and driven members having engaging friction surfaces, spring means effective to provide a constant initial pressure of said friction surfaces against each other, and centrifugally operated cam mechanism effective to increase said pressure in opposition to said first means as the speed of rotation of said driven member increases, and effective to decrease the pressure as the speed of rotation decreases.

9. An accelerating clutch comprising driving and driven members having engaging friction surfaces, spring means effective to provide a constant initial pressure of said friction surfaces against each other, a plurality of cam elements mounted on said driven member, and centrifugal means to actuate said cam elements in opposition to said means to increase said pressure as the speed of rotation of said driven member increases.

10. An accelerating clutch comprising driving and driven members having engaging friction surfaces, spring means effective to provide a constant initial pressure of said friction surfaces against each other, a plurality of cam elements mounted on said driven member, centrifugal means to actuate said cam elements in opposition to said means to increase said pressure as the speed of rotation of said driven member increases, a support for said cam elements movable axially relative to said driven member, and means to adjust said support axially to determine the operative position of said cam elements.

11. An accelerating clutch comprising a driving member having two friction surfaces, a driven member having a pair of friction discs engaging said surfaces and rotatable with said driven member but freely movable axially relative thereto, yielding means to move one disc axially toward said driving member thereby to provide an initial driving tension between said disc and driving member, and centrifugally operated means to move the other disc toward said driving member.

12. An accelerating clutch comprising a driving member having two friction surfaces, a driven member having a pair of friction discs engaging said surfaces and rotatable with said driven member but freely movable axially relative thereto, yielding means to move one disc axially toward said driving member thereby to provide an initial driving tension between said disc and driving member, and centrifugally operated means to move the other disc toward said driving member, said centrifugal operating means being rotatable with said driven member and being increasingly effective as the speed of rotation of said driven member increases.

13. An accelerating clutch comprising a driving member having two friction surfaces, a driven member having a pair of friction discs engaging said surfaces and rotatable with said driven member but freely movable axially relative thereto, yielding means to move one disc axially toward said driving member thereby to provide an initial driving tension between said disc and driving member, centrifugally operated elements effective to move the other disc toward said driving member thereby to provide an increased driving tension as the speed of rotation of said driving member increases, and a casing mounted on said driven member and effective to guard said mechanism and to limit outward movement of said centrifugal elements.

14. An accelerating clutch comprising driving and driven members, a pair of friction discs engaging opposite sides of said driving member, said discs being rotatable with said driven member but being freely movable axially relative thereto, a separate set of springs for each friction disc effective to provide initial friction pressure against said driving member, and additional means to apply increasing pressure on said driving member as the speed of rotation of said driven member increases.

15. An accelerating clutch comprising driving and driven members, a pair of friction discs engaging opposite sides of said driving member, said discs being rotatable with said driven member but being freely movable axially relative thereto, a separate set of springs for each friction disc effective to provide initial friction pressure against said driving member, means to adjust the initial pressure of said springs, and additional means to apply increasing pressure on said driving member as the speed of rotation of said driven member increases.

16. An accelerating clutch comprising driving and driven members, a pair of friction discs engaging opposite sides of said driving member, said discs being rotatable with said driven member but being freely movable axially relative thereto, a separate set of springs for each friction disc effective to provide initial friction pressure against said driving member, means to adjust the initial pressure of said springs, and centrifugally operating means effective to apply increasing pressure on said driving member as the speed of rotation of said driven member increases.

17. An accelerating clutch comprising driving and driven members, a pair of friction discs engaging opposite sides of said driving member, said discs being rotatable with said driven member but being freely movable axially relative thereto, a separate set of springs for each friction disc effective to provide initial friction pressure against said driving member, and a plurality of centrifugally operated cam levers mounted to rotate with said driven member and effective to apply increasing pressure on said driving member as the speed of rotation of said driven member increases.

18. An accelerating clutch comprising driving and driven members, a pair of friction discs engaging opposite sides of said driving member, said discs being rotatable with said driven member but being freely movable axially relative thereto, a separate set of springs for each friction disc effective to provide initial friction pressure against said driving member, a plurality of centrifugally operated cam levers mounted to rotate with said driven member and to apply increasing pressure on said driving member as the speed of rotation of said driven member increases, and springs effective to hold said cam elements in inoperative position when said driven member is at rest.

19. An accelerating clutch comprising driving and driven members, a pair of friction discs engaging opposite sides of said driving member, said discs being rotatable with said driven member but being freely movable axially relative thereto, a separate set of springs for each friction disc effective to provide initial friction pressure against said driving member, a plurality of centrifugally operated cam levers mounted to rotate with said driven member and to apply increasing pressure on said driving member as the speed of rotation of said driven member increases, and a support for said cam levers axially adjustable relative to said driven member but rotatable therewith.

20. An accelerating clutch comprising driving and driven members having opposed friction surfaces, means to provide a yielding initial driving pressure of said surfaces against each other, centrifugal means acting in opposition to said first means to increase said pressure as the speed of rotation of said driven member increases, and means to oppose positive resistance to the pressure of said centrifugal means as the driven member approaches the speed of said driving member.

21. An accelerating clutch comprising driving and driven members, spring means located on one side of said driving member effective to place an initial driving tension between said members, and means located on the other side of said driving member to increase said driving tension as the speed of rotation of said driven member increases.

22. An accelerating clutch comprising driving and driven members, means located on one side of said driving member and mounted on said driven member to place an initial driving tension between said members, and means located on the other side of said driving member and mounted on said driven member to increase said driving tension as the speed of rotation of said driven member increases.

23. An accelerating clutch comprising driving and driven members, means mounted on said driven member to place an initial driving tension between said members, and means also on said driven member acting in opposition to said first means to increase said driving tension as the speed of rotation of said driven member increases.

24. An accelerating clutch comprising driving and driven members, constantly acting pressure applying means effective to provide an initial driving tension between said members, and means acting in opposition to said first means, to increase said driving tension as the speed of rotation of said driving member increases, said last named means being mounted upon the driven member.

25. An accelerating clutch comprising driving and driven members, constantly acting means to apply a pressure and provide an initial driving tension between said member, and means acting in opposition to said first means to increase said driving tension as the speed of rotation of said driving member increases and effective to decrease said driving tension as the speed of rotation of said driven member decreases.

26. An accelerating clutch comprising driving and driven members, constantly acting means to apply a pressure and provide an initial driving tension between said member, and means acting in opposition to said first means to increase said driving tension as the speed of rotation of said driving member increases and effective to decrease said driving tension as the speed of rotation of said driven member decreases, said last named means being mounted upon the driven member.

27. An accelerating clutch comprising driving and driven members having friction surfaces, constantly acting pressure applying means effective to provide a constant initial pressure of said friction surfaces against each other, and means acting in opposition to said first means to increase said pressure in definite relation to the increase in speed of rotation of the driven member.

In testimony whereof I have hereunto affixed my signature.

LOUIS W. RAWSON.